(12) United States Patent
Katano et al.

(10) Patent No.: US 10,942,354 B2
(45) Date of Patent: Mar. 9, 2021

(54) MONOCULAR IMAGE DISPLAY DEVICE

(71) Applicant: Ricoh Company, Ltd., Tokyo (JP)

(72) Inventors: Yasuo Katano, Kanagawa (JP);
Shigenobu Hirano, Kanagawa (JP);
Ikue Kawashima, Kanagawa (JP);
Kenji Kameyama, Kanagawa (JP);
Takashi Maki, Kanagawa (JP); Yuuto Gotoh, Kanagawa (JP); Shiroh Ikegami, Tokyo (JP); Qing Liang, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/479,772

(22) Filed: Apr. 5, 2017

(65) Prior Publication Data
US 2017/0315357 A1  Nov. 2, 2017

(30) Foreign Application Priority Data

Apr. 27, 2016 (JP) .............................. JP2016-089127

(51) Int. Cl.
*G02B 27/01* (2006.01)
*G02B 26/02* (2006.01)
*G02F 1/157* (2006.01)

(52) U.S. Cl.
CPC ......... *G02B 27/0172* (2013.01); *G02B 26/02* (2013.01); *G02B 27/017* (2013.01); *G02F 1/157* (2013.01); *G02B 2027/0118* (2013.01); *G02B 2027/0178* (2013.01)

(58) Field of Classification Search
CPC .............. G02B 27/017; G02B 27/0172; G02B 2027/0174; G02B 2027/0178; G02B 27/0179
See application file for complete search history.

(56) References Cited

U.S. PATENT DOCUMENTS

| 3,460,530 | A | * | 8/1969 | Lorenz ..................... A61H 5/00 606/204.25 |
| 2007/0273761 | A1 | | 11/2007 | Maruyama et al. |
| 2014/0055324 | A1 | | 2/2014 | Hotta et al. |
| 2015/0138224 | A1 | * | 5/2015 | Kim ................... G02B 27/0172 345/592 |

(Continued)

FOREIGN PATENT DOCUMENTS

| JP | 6-337389 | 12/1994 |
| JP | 8-194186 | 7/1996 |

(Continued)

OTHER PUBLICATIONS

Office Action dated Dec. 24, 2019, issued in corresponding Japanese Patent Application No. 2016/089127, 5 pages.

(Continued)

*Primary Examiner* — Darryl J Collins
*Assistant Examiner* — Journey F Sumlar
(74) *Attorney, Agent, or Firm* — XSENUS LLP

(57) ABSTRACT

A monocular image display device includes a virtual image former to display an image in front of one eye of a user and a primary light amount adjuster being in front of another eye of the user. The primary light amount adjuster is disposed closer to the one eye of the user than an optical axis of the another eye of the user is.

15 Claims, 11 Drawing Sheets

(56) References Cited

U.S. PATENT DOCUMENTS

2016/0077345 A1    3/2016  Bohan et al.

FOREIGN PATENT DOCUMENTS

| | | | |
|---|---|---|---|
| JP | 11-202256 | 7/1999 | |
| JP | 2004-233908 | 8/2004 | |
| JP | 2004-280127 | 10/2004 | |
| JP | 2005-195822 A | 7/2005 | |
| JP | 2005-284007 | 10/2005 | |
| JP | 2007-086716 | 4/2007 | |
| JP | 2014-44334 A | 3/2014 | |
| KR | 20130025767 A * | 3/2013 | ......... H04N 13/0409 |
| WO | 2005/071464 A1 | 8/2005 | |

OTHER PUBLICATIONS

Office Action dated May 19, 2020, issued in corresponding Japanese Patent Application No. 2016-089127, 3 pages.

\* cited by examiner

MONOCULAR IMAGE DISPLAY DEVICE

CROSS-REFERENCE TO RELATED APPLICATION

This patent application is based on and claims priority pursuant to 35 U.S.C. § 119 to Japanese Patent Application No. 2016-089127, filed on Apr. 27, 2016, in the Japanese Patent Office, the entire disclosure of which is hereby incorporated by reference herein.

BACKGROUND

Technical Field

Exemplary embodiments generally relate to a monocular image display device, and more particularly, to a monocular image display device for displaying an image.

Background Art

A related art, head-mounted image display device is worn on a head of a user. The image display device is eyeglass-shaped and includes a transparent image display in front of an eye of the user. The image display device displays an image relating to information about surroundings of the user.

In order to prevent a field of view of the user from being restricted even while the user uses the image display device, the image display device may be a monocular image display device that allows one eye, that is, a first eye, of the user to view the surroundings, that is, a first image, and allows another eye, that is, a second eye, of the user to view an image displayed by the transparent image display, that is, a second image.

The first image recognized with the first eye viewing the surroundings is different from the second image recognized with the second eye that sees through the transparent image display. Accordingly, when the user wears the image display device outdoors, a difference in luminance between the first image and the second image may cause binocular rivalry, degrading visibility of the second image while the user views a combined image created by the second image superimposed on the first image.

In order to address this circumstance, the image display device may incorporate a screen that screens out external light.

However, if the difference in luminance between the first image and the second image is substantial when the user uses the image display device outdoors, the screen may decrease a transmittance of the external light to suppress binocular rivalry, degrading visibility of the surroundings viewed by the user.

SUMMARY

This specification describes below an improved monocular image display device. In one exemplary embodiment, the monocular image display device includes a virtual image former to display an image in front of one eye of a user and a primary light amount adjuster being in front of another eye of the user. The primary light amount adjuster is disposed closer to the one eye of the user than an optical axis of the another eye of the user is.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
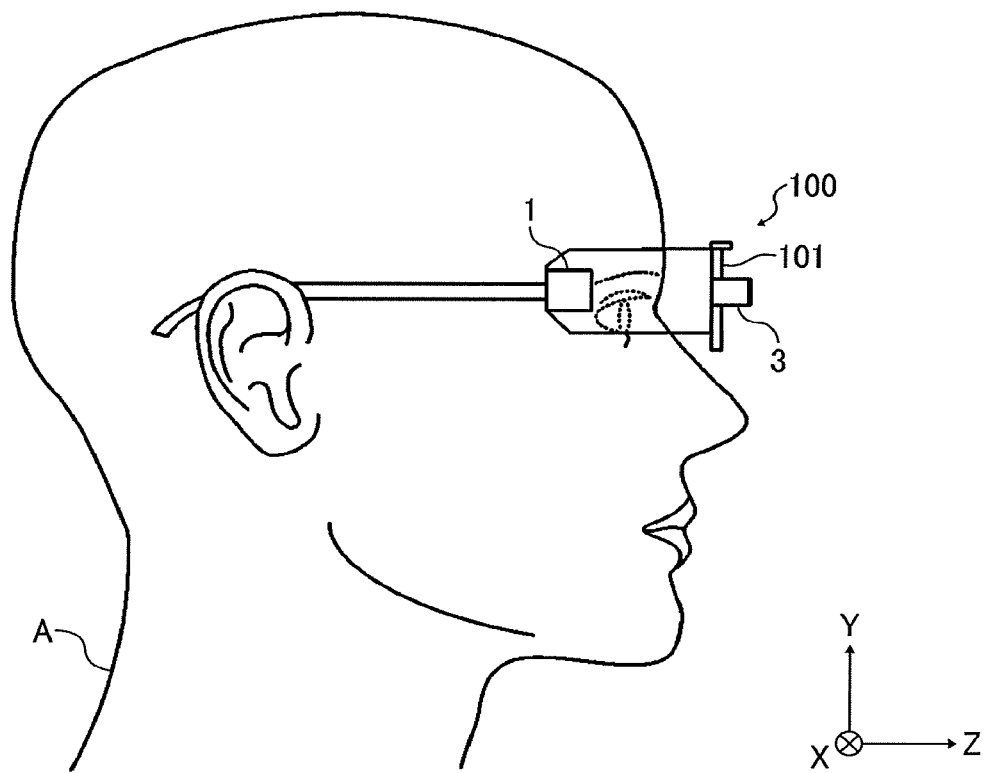
FIG. 1 is a schematic side view of an image display device according to an exemplary embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF THE DISCLOSURE

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring now to the drawings, wherein like reference numerals designate identical or corresponding parts throughout the several views, particularly to FIG. 1, an image display device 100 according to an exemplary embodiment is explained.

A description is provided of a construction of the image display device 100 according to this exemplary embodiment.

FIG. 1 is a schematic side view of the image display device 100. The image display device 100 is a head-mounted, monocular image display device worn on a head of a user A. FIG. 1 illustrates directions X, Y, and Z that are also used in subsequent drawings: the direction Z in which eyes of the user A are directed; a direction Y that is perpendicular to the direction Z and is vertically directed in FIG. 1; and a direction X that is perpendicular to the directions Z and Y and is directed horizontally in FIG. 1.

According to this exemplary embodiment, the image display device 100 is an eyeglass-shaped viewer placed on the head of the user A. The image display device 100 includes a frame 101, an image display 3, and an image output portion 1. The frame 101 is eyeglass-shaped and placed on the head of the user A. The image display 3 is a virtual image former that displays an image (e.g., a virtual image) in front of one eye, that is, a right eye, of the user A according to this exemplary embodiment. The image is disposed relative to the right eye of the user A in the direction X negatively of the user. The image output portion 1 is a projector that outputs the image.

Figure 2:
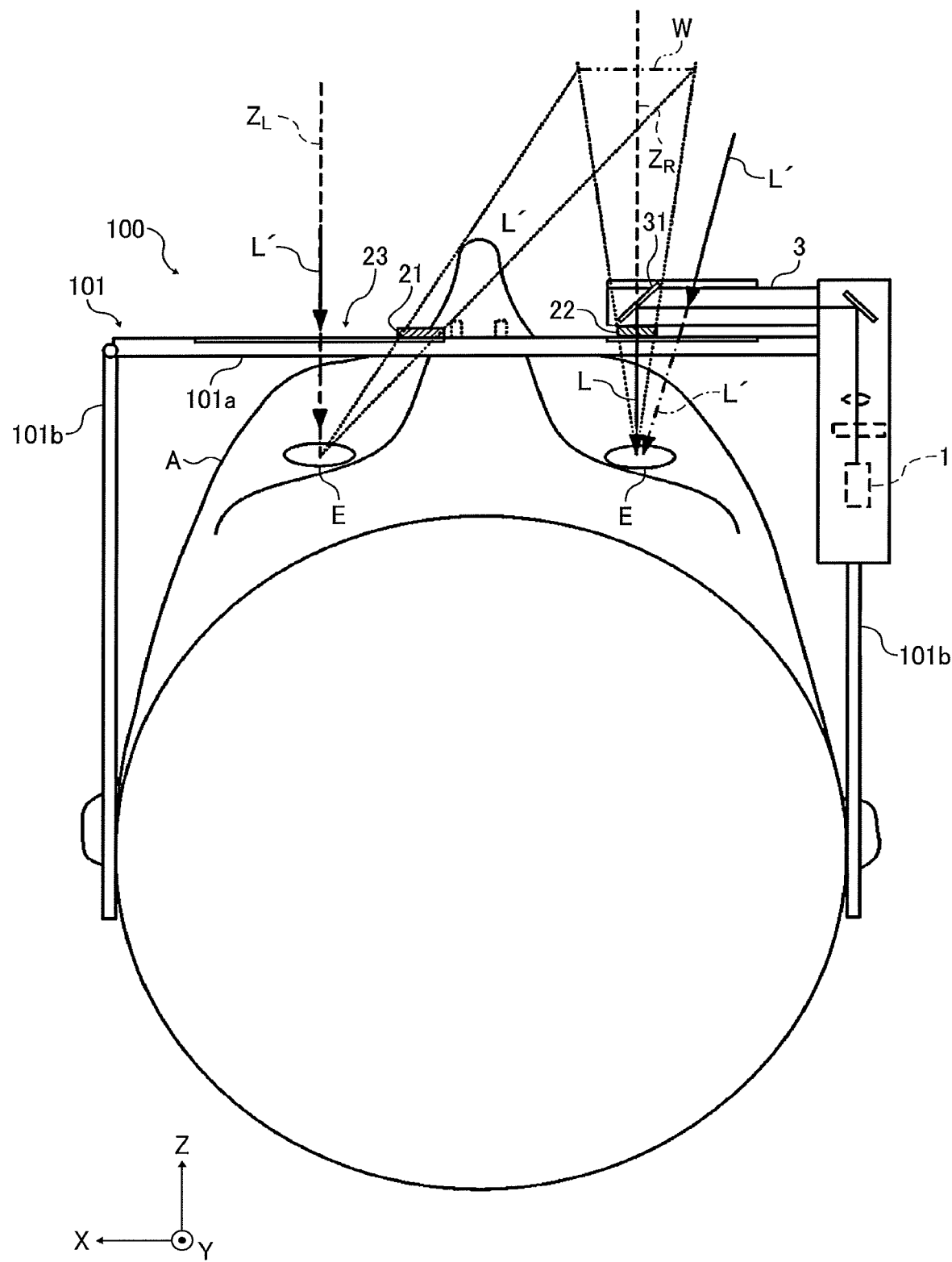
FIG. 2 is a plan view of the image display device depicted in FIG. 1 held by a head of a user.

FIG. 2 is a plan view of the image display device 100 held by the head of the user A. As illustrated in FIG. 2, the image display device 100 further includes a primary light amount adjuster 21 and a secondary light amount adjuster 22. The primary light amount adjuster 21 is in front of a left eye E of the user A. The secondary light amount adjuster 22 is in front of a right eye E of the user A and overlaps a virtual image formed by the image display 3 vertically.

A detailed description is now given of a construction of the frame 101.

The frame 101 mounts and supports the image display 3, the primary light amount adjuster 21, and the secondary light amount adjuster 22. The frame 101 includes a front portion 101a that is transparent and side portions 101b. The front portion 101a is in front of the eyes E of the user A. The side portions 101b are attached to the front portion 101a to support the front portion 101a. At least a part of each of the side portions 101b contacts the head of the user A.

A detailed description is now given of a configuration of the image output portion 1.

The image output portion 1 is mounted on a right side of the frame 101, that is, the side portion 101b disposed in proximity to the right eye E of the user A. The image output portion 1 is an image projector including a projection optical system that projects the image.

A detailed description is now given of a construction of the image display 3.

The image display 3 includes a reflection plate 31 that reflects light L, which forms the image and is output from the image output portion 1, toward the right eye E of the user A. The user A recognizes the image reflected by the reflection plate 31 as the virtual image projected in an image region W. Hence, the image display 3 serves as a virtual image former. In other words, the image region W is a recognition span or a recognition range where the right eye E of the user A views the image.

According to this exemplary embodiment, the reflection plate 31 is a non-transmissive mirror. Alternatively, the reflection plate 31 may be a transmissive semitransparent mirror. In this case, the secondary light amount adjuster 22 described below may be disposed on a wall situated relative to the reflection plate 31 in the direction Z positively.

A detailed description is now given of a configuration of the primary light amount adjuster 21 and the secondary light amount adjuster 22.

According to this exemplary embodiment, each of the primary light amount adjuster 21 and the secondary light amount adjuster 22 is a photochromic filter employing an electrochromic element mounted on the frame 101. Each of the primary light amount adjuster 21 and the secondary light amount adjuster 22 is a transmittance controller that controls a transmittance of light as each of the primary light amount adjuster 21 and the secondary light amount adjuster 22 is applied with a voltage. Each of the primary light amount adjuster 21 and the secondary light amount adjuster 22 is a light amount controller that controls an amount of external light L' reaching the eyes E of the user A.

According to this exemplary embodiment, each of the primary light amount adjuster 21 and the secondary light amount adjuster 22 employs the electrochromic element. Alternatively, each of the primary light amount adjuster 21 and the secondary light amount adjuster 22 may be a plate that suppresses the amount of the external light L', for example, a deflecting plate, a douser, or a screen plate. Yet alternatively, each of the primary light amount adjuster 21 and the secondary light amount adjuster 22 may be an element that adjusts the amount of light optically or electrically, such as a photochromic element and a liquid crystal element.

The electrochromic element is superior to the photochromic element in responsiveness to adjustment of the amount of light. The electrochromic element adjusts the amount of light in a broader range of optical transmittance compared to the liquid crystal element. Thus, the electrochromic element provides enhanced visibility even outdoors in the shade or in direct sunshine.

Although a location of the primary light amount adjuster 21 is different from a location of the secondary light amount adjuster 22, a construction of the primary light amount adjuster 21 is substantially identical to a construction of the secondary light amount adjuster 22. Hence, the following describes the construction of the primary light amount adjuster 21 and a description of the construction of the secondary light amount adjuster 22 is omitted.

Figure 3:
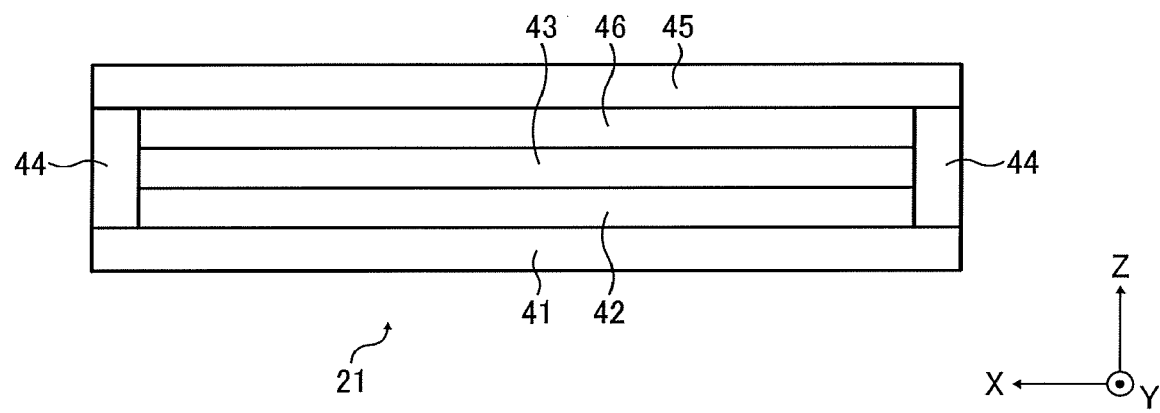
FIG. 3 is a cross-sectional view of a primary light amount adjuster incorporated in the image display device depicted in FIG. 2.

FIG. 3 is a cross-sectional view of the primary light amount adjuster 21. As illustrated in FIG. 3, the primary light amount adjuster 21 includes a glass substrate 41, an opposed substrate 45, and a display layer 43. The glass substrate 41 is disposed at a lowermost part of the primary light amount adjuster 21 in FIG. 3 in the direction Z negatively. The opposed substrate 45 is disposed opposite the glass substrate 41 and disposed at an uppermost part of the primary light amount adjuster 21 in FIG. 3 in the direction Z positively. The opposed substrate 45 serving as an uppermost face of the primary light amount adjuster 21 in FIG. 3 is opposite the glass substrate 41 serving as a lowermost face of the primary light amount adjuster 21 in FIG. 3. The display layer 43 is interposed between the glass substrate 41 and the opposed substrate 45.

The primary light amount adjuster 21 further includes a cavity layer 46, a titanium oxide particle layer 42, and spacers 44. The cavity layer 46 is interposed between the display layer 43 and the opposed substrate 45. The titanium oxide particle layer 42 is interposed between the display layer 43 and the glass substrate 41. The spacer 44 bridges between the glass substrate 41 and the opposed substrate 45 to define an interval between the glass substrate 41 and the opposed substrate 45.

The cavity layer 46 is a space surrounded by the display layer 43, the opposed substrate 45, and the spacers 44. The cavity layer 46 is filled with an electrolytic solution.

According to this exemplary embodiment, 1-Ethyl-3-methylimidazolium tetracyanoborate is used as the electrolytic solution. Alternatively, other material may be used as the electrolytic solution. Yet alternatively, instead of liquid electrolyte, gelled electrolyte or solid electrolyte such as polymer electrolyte may be used as the electrolytic solution.

The glass substrate 41 is a film substrate with indium tin oxide (ITO) film, which has an area defined by about 150 mm and about 80 mm. The titanium oxide particle layer 42 is a layer made of titanium oxide particles produced by application of a titanium oxide nanoparticle dispersion liquid. The display layer 43 is an electrochromic layer made of an electrochromic compound described below. An electric potential difference between both faces of the display layer 43 in the direction Z positively and negatively generates reductive reaction of the electrochromic compound, changing an absorption band of wavelength and resulting in coloration or bleaching. That is, as a spectrum and an intensity of a luminous flux transmitted through the display layer 43 change, the amount of light changes. In other words, the transmittance of the external light L' changes arbitrarily according to a voltage applied to both faces of the display layer 43.

The electrochromic compound is defined by a chemical formula (1) below. A one percent by weight 2,2,3,3-tetrafluoropropanol solution of an electrochromic compound as a coating liquid is applied onto the titanium oxide particle layer 42 by a spin coating method. Thus, an electrochromic compound layer is formed.

Chemical formula (1)

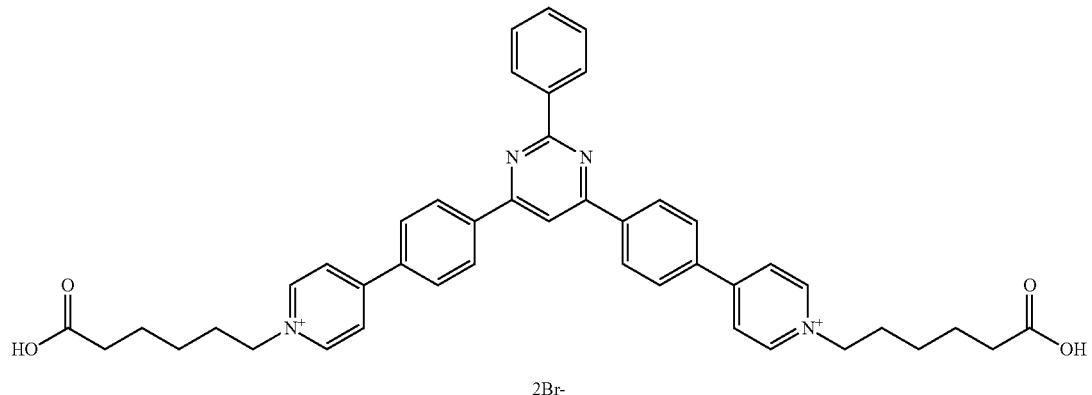

2Br-

Further, after a heating process of annealing for about 10 minutes at a temperature of about 120 degrees centigrade, the display layer 43 adsorbing the electrochromic compound is formed on a surface of the titanium oxide particle layer 42.

The primary light amount adjuster 21 is an electrochromic device that controls the transmittance of the external light L' by an electric signal through action of each layer such as the glass substrate 41, the titanium oxide particle layer 42, the display layer 43, and the cavity layer 46.

Figure 4:
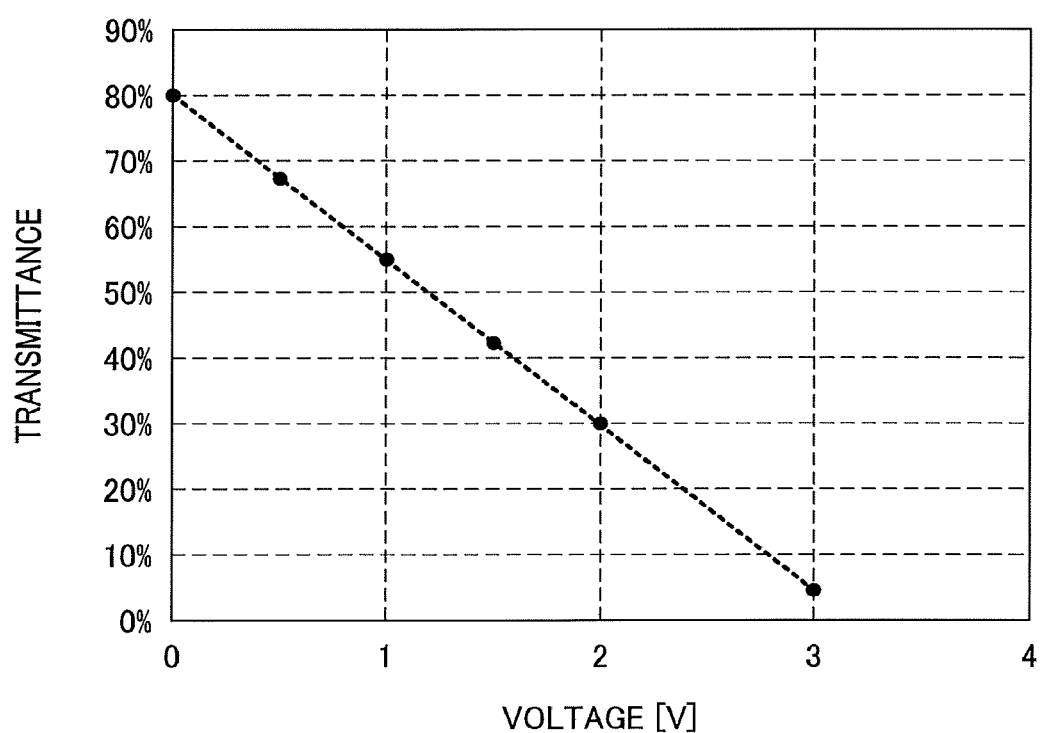
FIG. 4 is a graph illustrating a relation between a voltage applied to the primary light amount adjuster depicted in FIG. 3 and a transmittance of external light through the primary light amount adjuster.

FIG. 4 is a graph illustrating a relation between the voltage applied to the photochromic filter (e.g., the primary light amount adjuster 21 depicted in FIG. 3) and the transmittance of the external light L' through the photochromic filter. As illustrated in FIG. 4, according to this exemplary embodiment, the transmittance of the external light L' through the primary light amount adjuster 21 is switched to an arbitrary value in a range of from 2 percent to 80 percent according to the voltage applied to the primary light amount adjuster 21. The transmittance of the external light L' through the secondary light amount adjuster 22 is also switched similarly.

Instead of the titanium oxide particle layer 42 made of titanium oxide, a layer made of aluminum oxide, zinc oxide, silica, cesium oxide, yttrium oxide, or the like may be employed.

A description is provided of a method for reading information displayed on the image display device 100 while the user A views surroundings.

Figure 5A:
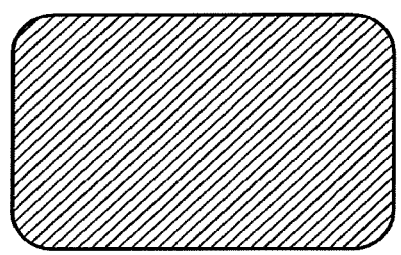
FIG. 5A is a schematic diagram of a first image recognized generally by a left eye of the user.
Figure 5B:
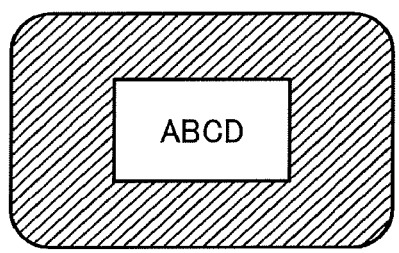
FIG. 5B is a schematic diagram of a second image recognized generally by a right eye of the user.

FIGS. 5A and 5B illustrate different images recognized generally by the left eye E and the right eye E of the user A, respectively. FIG. 5A is a schematic diagram of a first image recognized generally by the left eye E of the user A. FIG. 5B is a schematic diagram of a second image recognized generally by the right eye E of the user A.

Figure 5C:
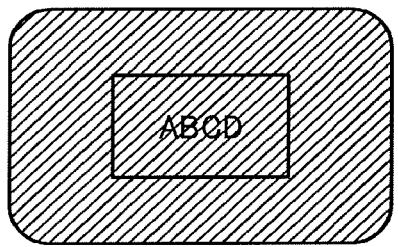
FIG. 5C is a schematic diagram of a combined image produced by combining the first image depicted in FIG. 5A and the second image depicted in FIG. 5B.

Generally, human eyes combine the first image recognized by the left eye E with the second image recognized by the right eye E, that is, superimpose the second image on the first image, to attain a field of view. Accordingly, when the user A wears the image display device 100, the first image is combined with the second image into a single combined image illustrated in FIG. 5C. FIG. 5C is a schematic diagram of the combined image.

Figure 6:
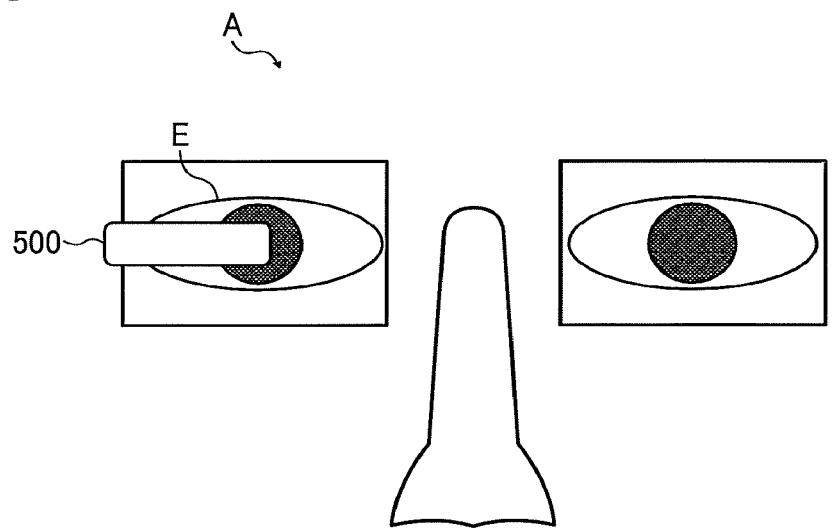
FIG. 6 is a diagram of a comparative monocular image display device.

FIG. 6 is a diagram of an image display device 500 as a comparative monocular image display device. When the user A wears the image display device 500 outdoors, the user A receives an amount of external light L' that is substantially greater than an amount of light L being emitted from the image display device 500 and defining an image displayed by the image display device 500. Human eyes do not combine the first image recognized by the left eye E with the second image recognized by the right eye E precisely. For example, when an image comes into view of both the left eye E and the right eye E, one of the left eye E and the right eye E recognizes the image mainly.

Figure 7:
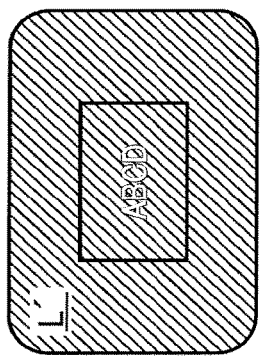
FIG. 7 is a schematic diagram of the combined image depicted in FIG. 5C recognized by the user wearing the comparative monocular image display device depicted in FIG. 6 when the external light is intense.

FIG. 7 is a schematic diagram of a combined image recognized by the user A wearing the image display device 500 when the external light L' is intense. As illustrated in FIG. 7, when the external light L' is intense, the second image (e.g., characters A, B, C, and D) captured by the right eye E may not be recognized readily due to a difference in contrast between the first image recognized by the left eye E and the second image recognized by the right eye E. Such circumstance is hereinafter referred to as binocular rivalry.

In order to prevent binocular rivalry, a luminance of the second image may be increased to suppress the difference in contrast between the first image recognized by the left eye E and the second image recognized by the right eye E. However, as the luminance of the second image increases, output from backlight and a voltage applied to the image display device 500 may increase, thus increasing manufacturing costs and upsizing the image display device 500.

Alternatively, a douser or a screen may be in front of the left eye E that is not disposed opposite the image display device 500 so that the douser or the screen suppresses the amount of the external light L' that enters the left eye E. However, if the amount of the external light L' decreases, the user A may suffer from degradation in visibility or visual recognition outdoors.

To address this circumstance, according to this exemplary embodiment, the primary light amount adjuster 21 restricts the amount of light in a part of the image region W, that influences visibility of the user A substantially, thus allowing the user A to achieve improvement in visibility of the image displayed by the image display device 100 and the field of view of the surroundings.

Figure 8:
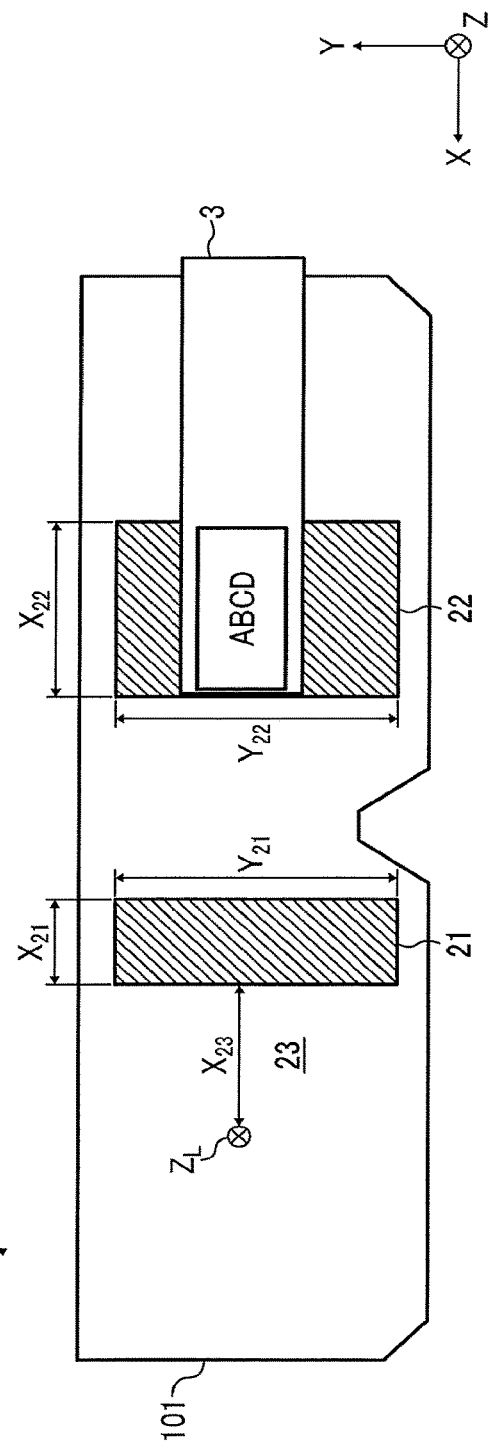
FIG. 8 is a schematic plan view of the image display device depicted in FIG. 2 seen in a direction Z negatively.
Figure 9:
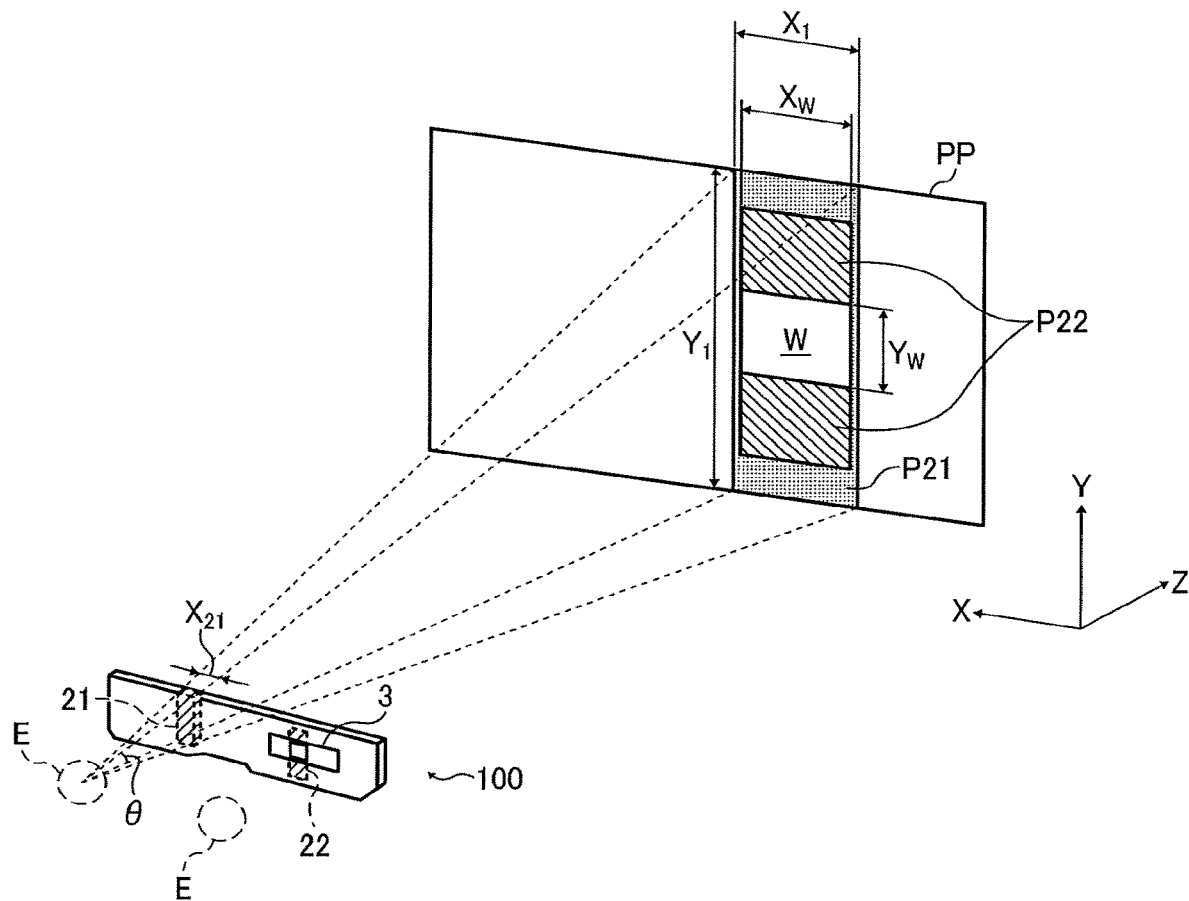
FIG. 9 is a perspective view of the image display device depicted in FIG. 8, schematically illustrating a field of view of the user wearing the image display device.

Referring to FIGS. 2, 8, and 9, a description is provided of positioning of the primary light amount adjuster 21.

FIG. 8 is a schematic plan view of the image display device 100 depicted in FIG. 2 seen in the direction Z negatively. FIG. 9 is a perspective view of the image display device 100, schematically illustrating the field of view of the user A wearing the image display device 100.

As the image output portion 1 depicted in FIG. 2 projects an image, the user A recognizes the image as a virtual image in the image region W as described above. As illustrated in FIG. 9, the image region W has a vertical length $Y_W$ and a horizontal length $X_W$. When the left eye E of the user A sees through the primary light amount adjuster 21, the primary light amount adjuster 21 is projected on a virtual projection plane PP as a projected primary light amount adjuster P21 that has a vertical length $Y_1$ and a horizontal length $X_1$.

The vertical length $Y_1$ of the projected primary light amount adjuster P21 is greater than the vertical length $Y_W$ of the image region W. The horizontal length $X_1$ of the projected primary light amount adjuster P21 is substantially identical to or is greater than the horizontal length $X_W$ of the image region W. Thus, a ratio of the vertical length $Y_1$ to the horizontal length $X_1$ of the projected primary light amount adjuster P21 defines the projected primary light amount adjuster P21 that is vertically elongated.

As schematically illustrated in FIG. 9, the primary light amount adjuster 21 is projected on the projection plane PP such that the virtual image in the image region W is superimposed on the projected primary light amount adjuster P21 and recognizable by the user A. Accordingly, the horizontal length $X_1$ of the projected primary light amount adjuster P21 is greater than a horizontal length $X_{21}$ of the primary light amount adjuster 21 in the direction X depicted in FIGS. 8 and 9. The vertical length $Y_1$ of the projected primary light amount adjuster P21 is greater than a vertical length $Y_{21}$ of the primary light amount adjuster 21 in the direction Y depicted in FIG. 8.

Figure 10A:
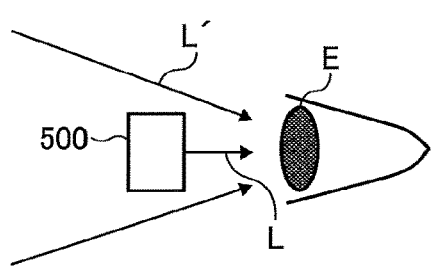
FIG. 10A is a schematic diagram of the comparative monocular image display device depicted in FIG. 6, illustrating the external light entering the eye of the user.

Additionally, outdoors, the sun as a greatest light source is above the user A. Light of the sun is also reflected from the ground. Hence, as illustrated in FIG. 10A, the amount of the external light L' that enters the eye E of the user A substantially vertically from the sun and the ground is relatively great. FIG. 10A is a schematic diagram of the image display device 500, illustrating the external light L' entering the eye E of the user A.

Figure 10B:
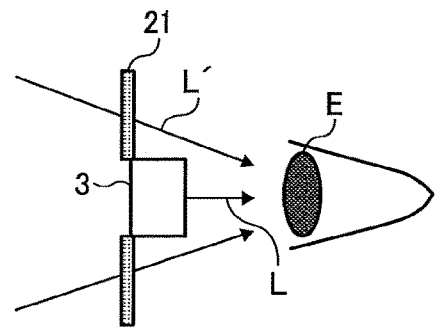
FIG. 10B is a schematic diagram of an image display and the primary light amount adjuster of the image display device depicted in FIG. 9, illustrating the external light entering the eye of the user.

FIG. 10B is a schematic diagram of the image display 3 and the primary light amount adjuster 21 of the image display device 100, illustrating the external light L' entering the eye E of the user A. As illustrated in FIG. 10B, the primary light amount adjuster 21 that is vertically elongated shields the eye E of the user A from the external light L' that is intense and entered into the eye E of the user A substantially vertically, thus reducing the amount of the external light L' entering the eye E of the user A. Accordingly, the primary light amount adjuster 21 allows the user A to recognize the image output by the image output portion 1 with improved visibility.

As illustrated in FIG. 9, the horizontal length $X_1$ of the projected primary light amount adjuster P21 is substantially identical to the horizontal length $X_W$ of the image region W. The term "substantially identical" denotes a state in which the projected primary light amount adjuster P21 overlays the image region W defined by the virtual image horizontally. Accordingly, the primary light amount adjuster 21 does not screen out the external light L' unnecessarily, improving visibility of the user A in the entire field of view.

The horizontal length $X_{21}$ of the primary light amount adjuster 21 is great enough to cause the horizontal length $X_1$ of the projected fight light amount adjuster P21 to be greater than at least the horizontal length $X_W$ of the image region W on the projection plane PP. Hence, alternatively, the horizontal length $X_1$ of the projected primary light amount adjuster P21 may not be substantially identical to the horizontal length $X_W$ of the image region W.

As illustrated in FIG. 2, the primary light amount adjuster 21 is disposed closer to the right eye E of the user A in the direction X negatively than an optical axis $Z_L$ penetrating through a center of the left eye E of the user A is. FIG. 2 also illustrates an optical axis $Z_R$ penetrating through a center of the right eye E of the user A. According to this exemplary embodiment, the image display device 100 further includes a transmission portion 23 interposed between the primary light amount adjuster 21 and the optical axis $Z_L$ horizontally. The transmission portion 23 serves as an interval between a lateral end of the primary light amount adjuster 21 in the direction X positively and the optical axis $Z_L$. The transmission portion 23 is embedded in the frame 101 and is a part of the front portion 101a disposed in front of the eyes E of the user A. The transmission portion 23 does not screen out the external light L' and allows the external light L' to transmit through the transmission portion 23.

A detailed description is now given of advantages of the transmission portion 23.

As described above with reference to FIG. 9, the vertical length $Y_1$ of the projected primary light amount adjuster P21, when viewed with the left eye E of the user A, is greater than the vertical length $Y_W$ of the image region W. The horizontal length $X_1$ of the projected primary light amount adjuster P21 is substantially identical to the horizontal length $X_W$ of the image region W.

Figure 11A:
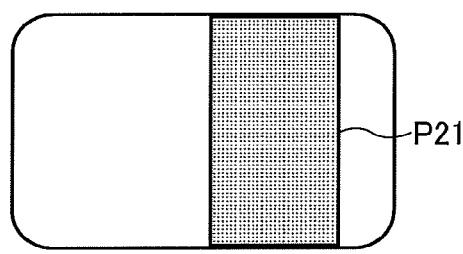
FIG. 11A is a schematic diagram of a first field of view illustrating a projected primary light amount adjuster recognized by the left eye of the user.
Figure 11B:
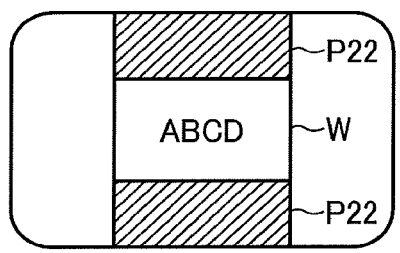
FIG. 11B is a schematic diagram of a second field of view illustrating a projected secondary light amount adjuster and an image region that are recognized by the right eye of the user.
Figure 11C:
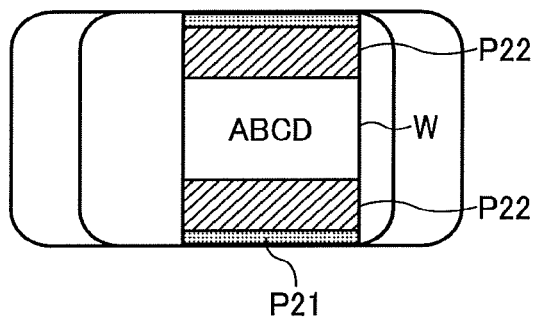
FIG. 11C is a schematic diagram of a combined image created by the second field of view depicted in FIG. 11B that is superimposed on the first field of view depicted in FIG. 11A on a projection plane.

FIG. 11A is a schematic diagram of a first field of view illustrating the projected primary light amount adjuster P21 recognized by the left eye E of the user A. FIG. 11B is a schematic diagram of a second field of view illustrating a projected secondary light amount adjuster P22 and the image region W that are recognized by the right eye E of the user A. The projected secondary light amount adjuster P22 is projected on the projection plane PP as illustrated in FIG. 9. FIG. 11C is a schematic diagram of a combined image created by the second field of view depicted in FIG. 11B that is superimposed on the first field of view depicted in FIG. 11A on the projection plane PP.

As illustrated in FIG. 11C, the image region W is surrounded by a screen region produced by the primary light amount adjuster 21 that screens out the external light L'. Thus, the primary light amount adjuster 21 reduces the amount of the external light L' from the surroundings, enhancing visibility of the image region W by the user A.

As illustrated in FIG. 2, the primary light amount adjuster 21 is disposed closer to the right eye E of the user A in the direction X negatively than the optical axis $Z_L$ penetrating through the center of the left eye E of the user A is. Accordingly, the primary light amount adjuster 21 does not screen out the external light L' in a periphery of the optical axis $Z_L$ of the left eye E. Consequently, the primary light amount adjuster 21 enhances visibility of the image region W by the user A while preventing degradation in visibility of the left eye E not disposed opposite the image display 3.

As illustrated in FIG. 8, the secondary light amount adjuster 22 sandwiches the image display 3, which forms the virtual image in the image region W, vertically in the direction Y. Accordingly, the secondary light amount adjuster 22 prevents the external light L' from intensely entering the right eye E of the user A substantially vertically as illustrated in FIG. 10A, thus enhancing visibility of the image region W by the user A.

The vertical length $Y_{21}$ of the primary light amount adjuster 21 and a vertical length $Y_{22}$ of the secondary light amount adjuster 22 depicted in FIG. 8 are determined based on an angle θ depicted in FIG. 9. The angle θ is formed by a line connecting the center of the eye E and an upper edge of each of the primary light amount adjuster 21 and the secondary light amount adjuster 22 and a line connecting the center of the eye E and a lower edge of each of the primary light amount adjuster 21 and the secondary light amount adjuster 22. The angle θ is greater than an angle formed by adding a vertical rotation angle of eye movement to an effective angle of view of the user A.

Figure 12:
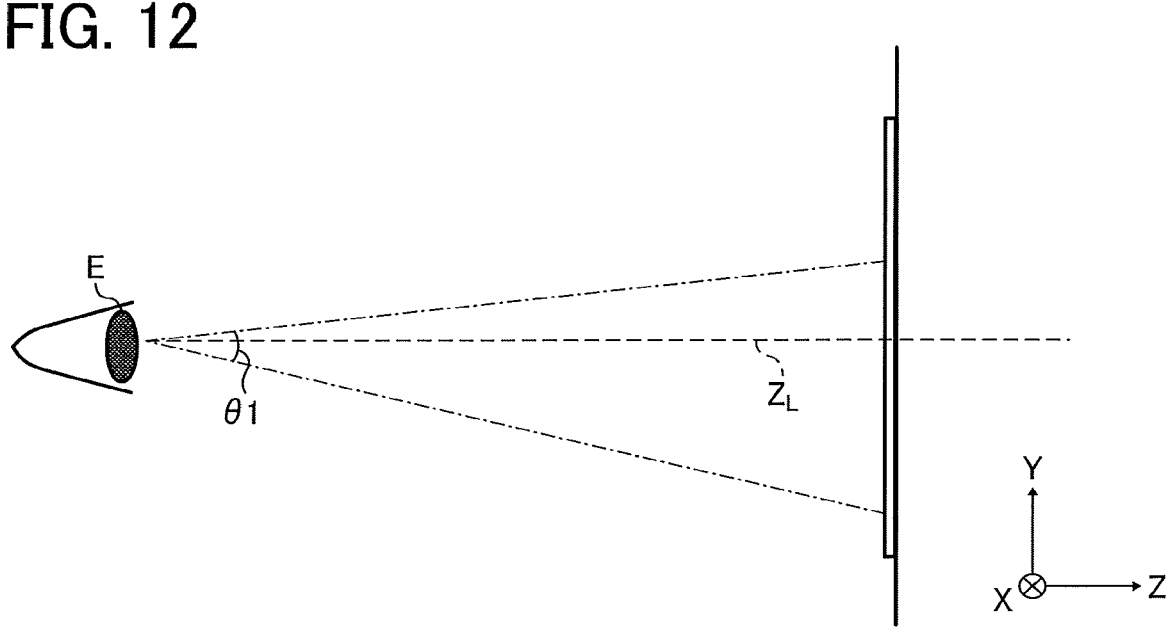
FIG. 12 is a schematic diagram for explaining a method for measuring an effective angle of view.

FIG. 12 is a schematic diagram for explaining a method for measuring the effective angle of view. As illustrated in FIG. 12, the effective angle of view is a stable gazing angle of view θ1, that is, an angle of view with which the user A reads or recognizes a character or an object in front of the user A without moving an eyeball when the user A directs a gaze forward such that the gaze coincides with the optical axis $Z_L$ of the eyeball.

According to this exemplary embodiment, the effective angle of view in the direction Y is an angle at which the user A reads a numeral of a scale on a plate without moving the head and the eyeball. The plate is spaced apart from the user A with an interval of 50 cm. The scale has divisions originated from a point in front of the gaze of the user A and aligned in the directions X and Y with a predetermined interval between the adjacent divisions.

A measurement was performed as described above for 20 persons. The effective angle of view in the direction Y was about 20 degrees according to the measurement.

The vertical rotation angle of eye movement is in a range of natural vertical eye movement, for example, in a range of from 30 degrees to 40 degrees physiologically. Accordingly, the angle θ according to this exemplary embodiment is in a range of from 50 degrees to 60 degrees or more in the direction Y from the optical axis $Z_L$ of the left eye E, that is, a center of the gaze.

For example, if a distance from a summit of a cornea to each of the primary light amount adjuster 21 and the secondary light amount adjuster 22 is 30 mm, each of the vertical length $Y_{21}$ of the primary light amount adjuster 21 and the vertical length $Y_{22}$ of the secondary light amount adjuster 22 is in a range of from 28 mm to 35 mm. A horizontal length $X_{23}$ depicted in FIG. 8 of the transmission portion 23 in the direction X is determined based on the effective angle of view of the left eye E and the right eye E. If the distance from the summit of the cornea to each of the primary light amount adjuster 21 and the secondary light amount adjuster 22 is 30 mm, the horizontal length $X_{23}$ of the transmission portion 23 is about 20 mm.

A description is provided of a first example, a second example, and a third example of the image display device 100.

A description is now given of the first example of the image display device 100.

The first example of the image display device 100 employed an electrochromic element having the vertical length $Y_{21}$ of 30 mm and the horizontal length $X_{21}$ of 20 mm as the primary light amount adjuster 21. The first example of the image display device 100 employed an electrochromic element having the vertical length $Y_{22}$ of 10 mm and a horizontal length $X_{22}$ of 25 mm as the secondary light amount adjuster 22 sandwiching the image display 3 vertically. InfoLinker manufactured by WESTUNITIS CO., LTD. was employed as the image display 3. Safety goggles No. 338 manufactured by Yamamoto Kogaku, Co., Ltd. was employed as the frame 101. The image display 3 displayed an image made of a black character of 20 points on a white background.

The primary light amount adjuster 21 was applied with a voltage of 2 V for 5 seconds during coloration. During bleaching, the primary light amount adjuster 21 was applied with a voltage of 0.5 V having a polarity opposite a polarity during coloration for 5 seconds. Thus, visibility attained by the user A was measured outdoors and indoors. The transmittance of light of the primary light amount adjuster 21 was 10 percent during coloration and 75 percent during bleaching.

The user A who wore the image display device 100 read the characters displayed in the image region W while looking around in a room with an illuminance of 1000 Lx. When the transmittance of light of each of the primary light amount adjuster 21 and the secondary light amount adjuster 22 was 75 percent, the user A did not read the characters displayed in the image region W readily due to binocular rivalry. Conversely, when the transmittance of light of each of the primary light amount adjuster 21 and the secondary light amount adjuster 22 was 10 percent, the user A read the characters displayed in the image region W with improved visibility.

Similarly, the user A read the characters displayed in the image region W while looking around outdoors under a clear sky with an illuminance of 35000 Lx.

When the transmittance of light of each of the primary light amount adjuster 21 and the secondary light amount adjuster 22 was 75 percent, the user A did not read the characters displayed in the image region W readily due to binocular rivalry. Conversely, when the transmittance of light of each of the primary light amount adjuster 21 and the secondary light amount adjuster 22 was 10 percent, the user A read the characters displayed in the image region W with improved visibility.

A description is now given of the second example of the image display device 100.

Figure 13:
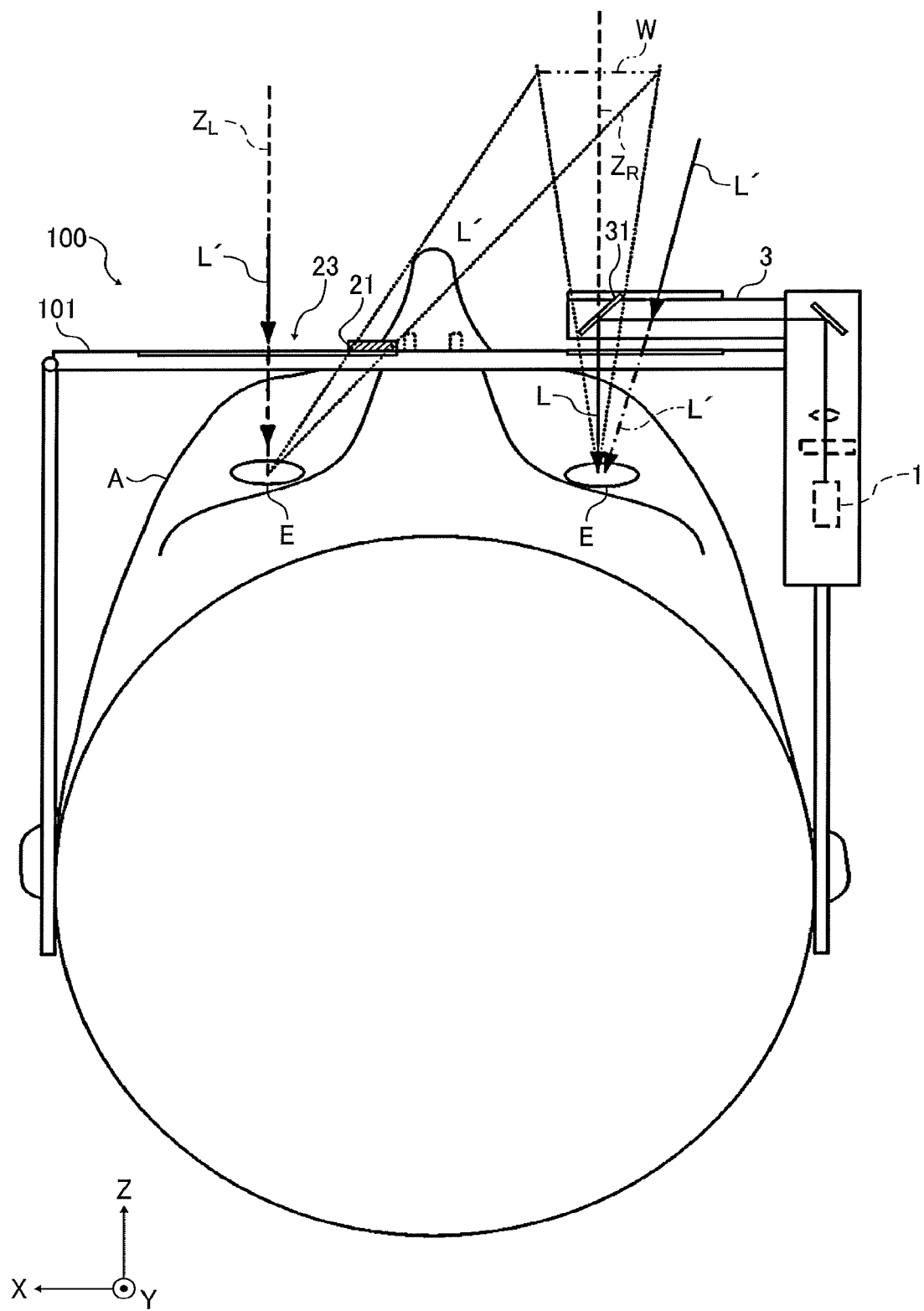
FIG. 13 is a plan view of a variation of the image display device depicted in FIG. 2.

FIG. 13 is a plan view of the image display device 100 according to the second example. As illustrated in FIG. 13, the second example of the image display device 100 employed an electrochromic element having the vertical length $Y_{21}$ of 30 mm and the horizontal length $X_{21}$ of 20 mm as the primary light amount adjuster 21. Unlike the first example of the image display device 100, the second example of the image display device 100 did not incorporate the secondary light amount adjuster 22. Other configuration of the second example of the image display device 100 was equivalent to a configuration of the first example of the image display device 100.

The primary light amount adjuster 21 was applied with a voltage of 2 V for 5 seconds during coloration. During bleaching, the primary light amount adjuster 21 was applied with a voltage of 0.5 V having a polarity opposite a polarity during coloration for 5 seconds. Thus, visibility attained by the user A was measured outdoors and indoors. The transmittance of light of the primary light amount adjuster 21 was 10 percent during coloration and 75 percent during bleaching.

The user A who wore the image display device 100 read the characters displayed in the image region W while looking around in a room with an illuminance of 1000 Lx. When the transmittance of light of the primary light amount adjuster 21 was 75 percent, the user A did not read the characters displayed in the image region W readily due to binocular rivalry. Conversely, when the transmittance of light of each of the primary light amount adjuster 21 and the secondary light amount adjuster 22 was 10 percent, the user A read the characters displayed in the image region W with improved visibility.

Similarly, the user A read the characters displayed in the image region W while looking around outdoors under a cloudy sky with an illuminance of 4000 Lx.

When the transmittance of light of the primary light amount adjuster 21 was 75 percent, the user A did not read the characters displayed in the image region W readily due to binocular rivalry. Conversely, when the transmittance of light of each of the primary light amount adjuster 21 and the secondary light amount adjuster 22 was 10 percent, the user A read the characters displayed in the image region W with improved visibility.

Both indoors and outdoors, the field of view of surroundings was not blocked, allowing the user A to view the surroundings.

A description is now given of the third example of the image display device 100.

The third example of the image display device 100 employed an electrochromic element having the vertical length $Y_{21}$ of 30 mm and the horizontal length $X_{21}$ of 20 mm as a primary light amount adjuster 24. The third example of the image display device 100 employed an electrochromic element having the vertical length $Y_{22}$ of 10 mm and the horizontal length $X_{22}$ of 25 mm as the secondary light amount adjuster 22 sandwiching the image display 3 vertically. InfoLinker manufactured by WESTUNITIS CO., LTD. was employed as the image display 3. Safety goggles No. 338 manufactured by Yamamoto Kogaku, Co., Ltd. was employed as the frame 101. A distance from the eye E of the user A to the front portion 101a of the frame 101 was about 25 mm. The image display 3 displayed an image made of a black character of 20 points on a white background.

Figure 14A:
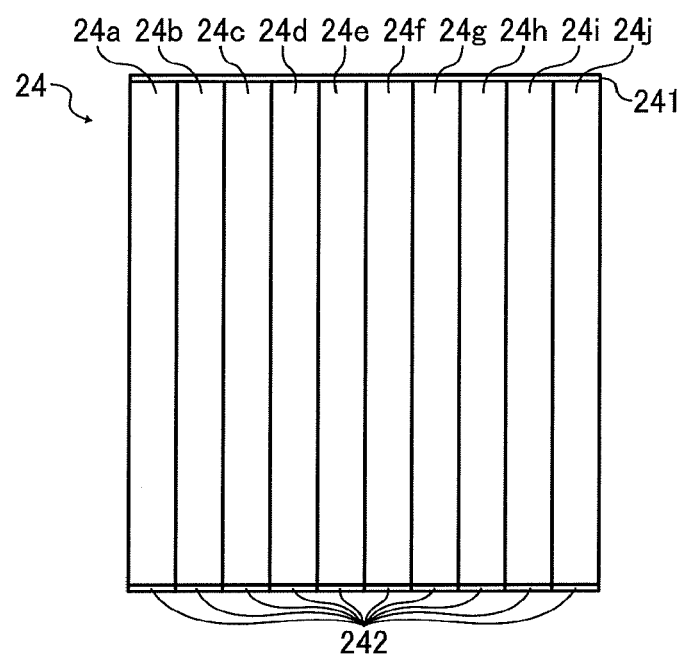
FIG. 14A is a plan view of a variation of the primary light amount adjuster depicted in FIG. 3.

FIG. 14A is a plan view of the primary light amount adjuster 24. As illustrated in FIG. 14A, the primary light amount adjuster 24 includes ten screens 24a, 24b, 24c, 24d, 24e, 24f, 24g, 24h, 24i, and 24j, each of which is a strip. The transmittance of light is adjusted separately for each of the screens 24a to 24j. FIG. 14A illustrates the primary light amount adjuster 24 equally divided into ten strips. Alternatively, the primary light amount adjuster 24 may be divided into a plurality of portions, for each of which the transmittance of light is adjusted separately.

Each of the screens 24a to 24j is an electrochromic element of which transmittance of light is altered by a voltage applied thereto.

FIG. 14A illustrates a configuration in which the voltage applied between an upper electrode 241 and a plurality of lower electrodes 242 is controlled. The upper electrode 241 is shared by the screens 24a to 24j. The lower electrodes 242 are coupled to the screens 24a to 24j separately to actuate the screens 24a to 24j selectively.

The plurality of lower electrodes 242 is mounted on each of the screens 24a to 24j (e.g., strips). The plurality of lower electrodes 242 includes fifty lower electrodes 242. Forty lower electrodes 242 out of the fifty lower electrodes 242 are disposed at a center span of the fifty lower electrodes 242. The forty lower electrodes 242 cause selected ones of the screens 24a to 24j to screen out light constantly. Remaining ten lower electrodes 242 were used to perform a control described below that addresses an individual difference.

A position of the primary light amount adjuster 24 projected on the projection plane PP in the field of view in the direction X varies between the user A and a user B.

To address this circumstance, the primary light amount adjuster 24 adjusts a portion thereof where the transmittance of light is decreased based on the individual difference. Accordingly, if the user A wears the image display device 100, the transmittance of light is decreased for the screens 24c to 24i corresponding to the image region W to adjust the amount of light entering the eye E of the user A, thus enhancing visibility attained by the user A to view the image readily.

Figure 14B:
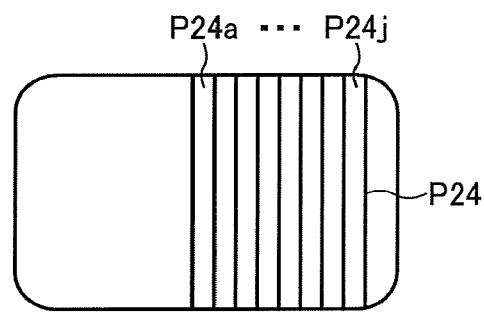
FIG. 14B is a schematic diagram of a first field of view illustrating a projected primary light amount adjuster produced by the primary light amount adjuster depicted in FIG. 14A, which is recognized by the left eye of the user.

FIG. 14B is a schematic diagram of a first field of view illustrating a projected primary light amount adjuster P24 recognized by the left eye E of the user A. The projected primary light amount adjuster P24 is projected on the projection plane PP. The projected primary light amount adjuster P24 includes projected screens P24a to P24j projected on the projection plane PP.

Figure 14C:
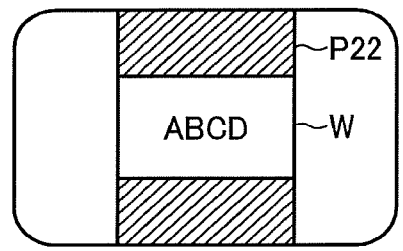
FIG. 14C is a schematic diagram of a second field of view illustrating the projected secondary light amount adjuster and the image region that are recognized by the right eye of the user.
Figure 14D:
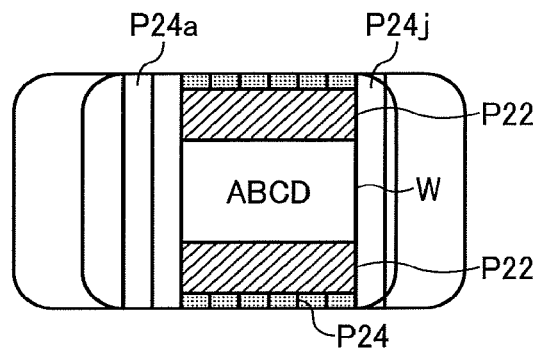
FIG. 14D is a schematic diagram of a combined image created by the second field of view depicted in FIG. 14C that is superimposed on the first field of view depicted in FIG. 14B on the projection plane.

FIG. 14C is a schematic diagram of a second field of view illustrating the projected secondary light amount adjuster P22 and the image region W that are recognized by the right eye E of the user A. FIG. 14D is a schematic diagram of a combined image created by the second field of view depicted in FIG. 14C that is superimposed on the first field of view depicted in FIG. 14B on the projection plane PP.

Conversely, as illustrated in FIGS. 15A to 15D, if the user B wears the image display device 100, since a portion of the primary light amount adjuster 24 that corresponds to the image region W in the field of view is different between the user A and the user B, the transmittance of light is decreased for the screens 24b to 24h corresponding to the image region W to adjust the amount of light entering the eye E of the user A, thus enhancing visibility attained by the user B to view the image.

Figure 15A:
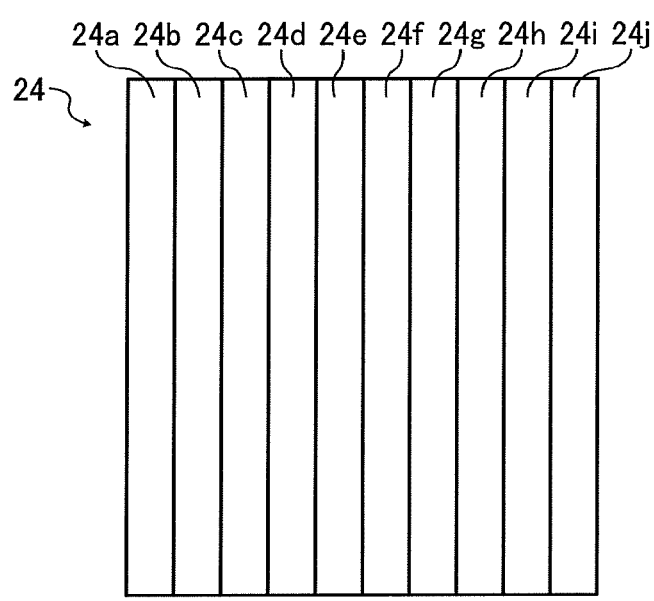
FIG. 15A is a schematic diagram of the primary light amount adjuster depicted in FIG. 14A used by another user.
Figure 15B:
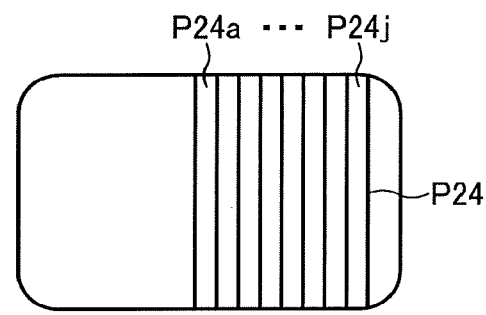
FIG. 15B is a schematic diagram of a first field of view illustrating the projected primary light amount adjuster recognized by a left eye of the another user.
Figure 15C:
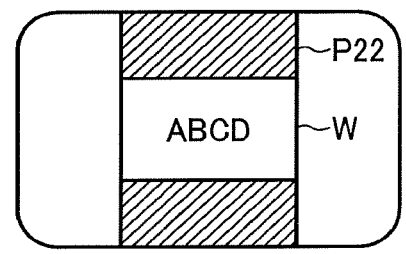
FIG. 15C is a schematic diagram of a second field of view illustrating the projected secondary light amount adjuster and the image region that are recognized by a right eye of the another user.
Figure 15D:
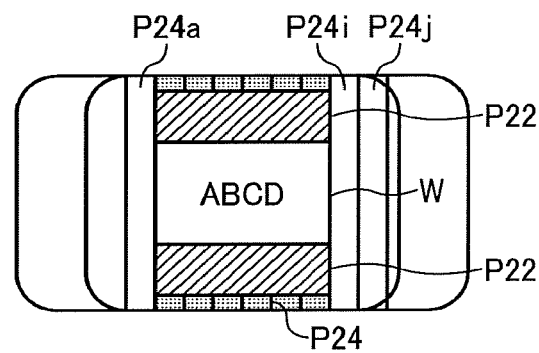
FIG. 15D is a schematic diagram of a combined image created by the second field of view depicted in FIG. 15C that is superimposed on the first field of view depicted in FIG. 15B on the projection plane.

FIG. 15A is a schematic diagram of the primary light amount adjuster 24 used by the user B. FIG. 15B is a schematic diagram of a first field of view illustrating the projected primary light amount adjuster P24 recognized by a left eye E of the user B. FIG. 15C is a schematic diagram of a second field of view illustrating the projected secondary light amount adjuster P22 and the image region W that are recognized by a right eye E of the user B. FIG. 15D is a schematic diagram of a combined image created by the second field of view depicted in FIG. 15C that is superimposed on the first field of view depicted in FIG. 15B on the projection plane PP.

As described above, the primary light amount adjuster 24 includes the screens 24a to 24j that are aligned in the direction X and selectively actuated according to the user A or B to correspond to the image region W in the field of view of the user A or B, which varies depending on the individual difference. Thus, the primary light amount adjuster 24 enhances visibility of the image viewed by the users A and B without degrading the field of view of the users A and B.

Since the third example of the image display device 100 shares an identical construction with the first example of the image display device 100 except for the primary light amount adjuster 24, a description of the construction of the third example of the image display device 100 other than the construction of the primary light amount adjuster 24 is omitted.

The user A who wore the image display device 100 read the characters displayed in the image region W while looking around in a room with an illuminance of 1000 Lx.

When the transmittance of light of the primary light amount adjuster 24 was 75 percent, the users A and B did not read the characters displayed in the image region W readily due to binocular rivalry. Conversely, when the transmittance of light of the primary light amount adjuster 24 was 10 percent, the users A and B read the characters displayed in the image region W with improved visibility.

Similarly, the users A and B read the characters displayed in the image region W while looking around outdoors under a clear sky with an illuminance of 35000 Lx.

When the transmittance of light of the primary light amount adjuster 24 was 75 percent, the users A and B did not read the characters displayed in the image region W readily due to the external light L'. Conversely, when the transmittance of light of the primary light amount adjuster 24 was 10 percent, the users A and B read the characters displayed in the image region W with improved visibility.

Both indoors and outdoors, the field of view of surroundings was not blocked, allowing the users A and B to view the surroundings. Additionally, the transmittance of light of the screens 24a to 24j are adjusted separately according to the user A or B, allowing the users A and B to read the characters displayed in the image region W with improved visibility regardless of the individual difference.

A description is provided of a construction of an image display device 400 as a comparative example of the image display device 100.

Figure 16A:
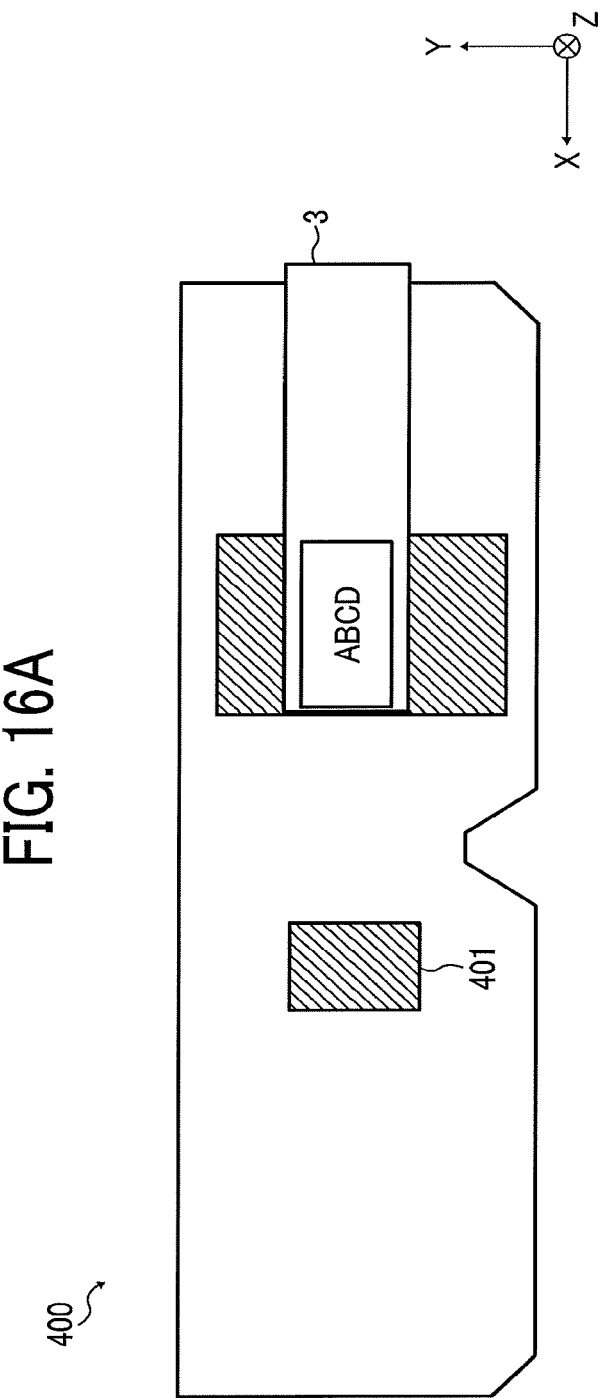
FIG. 16A is a plan view of an image display device incorporating a screen.
Figure 16B:
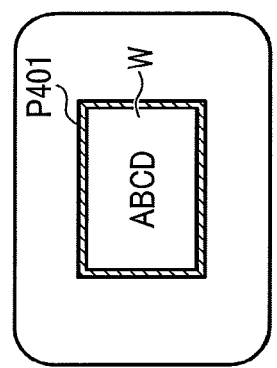
FIG. 16B is a schematic diagram of a combined image created by the image region superimposed on a projected screen produced by projecting the screen depicted in FIG. 16A on the projection plane.

FIG. 16A is a plan view of the image display device 400 incorporating a screen 401. FIG. 16B is a schematic diagram of a combined image created by the image region W superimposed on a projected screen P401 produced by projecting the screen 401 on the projection plane PP. As illustrated in FIG. 16A, the image display device 400 includes the screen 401 and the image display 3. As illustrated in FIG. 16B, a size of the projected screen P401 is substantially identical to a size of the image region W. The image display 3 displays an image (e.g., the characters A, B, C, and D) in the image region W.

The user A who wore the image display device 400 read the characters displayed in the image region W while looking around outdoors under a clear sky with an illuminance of 35000 Lx.

With the screen 401 having the transmittance of light of 10 percent, recognition of the characters displayed in the image region W by the user A degraded due to the external light L' under direct sunshine or the external light L' reflected from the ground.

The present disclosure is not limited to the details of the exemplary embodiments described above and various modifications and improvements are possible.

For example, according to the exemplary embodiments described above, the image display device 100 includes the primary light amount adjuster 21 and the secondary light amount adjuster 22. Alternatively, the image display device 100 may include the primary light amount adjuster 21 and may not include the secondary light amount adjuster 22.

Further, according to the exemplary embodiments described above, the image display device 100 is eyeglass-shaped. Alternatively, the image display device 100 may have other shape. Further, according to the exemplary embodiments described above, the image display 3 is monocular and is disposed in front of the right eye E. Alternatively, the image display 3 may be disposed in front of the left eye E.

A description is provided of advantages of a monocular image display device (e.g., the image display device 100).

As illustrated in FIG. 8, the monocular image display device includes a virtual image former (e.g., the image display 3) and a primary light amount adjuster (e.g., the primary light amount adjusters 21 and 24). As illustrated in FIG. 2, the virtual image former displays an image in front of one eye (e.g., the right eye E) of a user (e.g., the user A). The primary light amount adjuster is in front of another eye (e.g., the left eye E) of the user. The primary light amount adjuster is disposed closer to the one eye of the user horizontally than an optical axis (e.g., the optical axis $Z_L$) of the another eye of the user is.

Accordingly, the image display device allows the user to view the image and surroundings in a field of view of the user with enhanced visibility.

The advantages achieved by the exemplary embodiments described above are examples and therefore are not limited to those described above.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present invention.

Any one of the above-described operations may be performed in various other ways, for example, in an order different from the one described above.

What is claimed is:

1. A monocular image display device, comprising:
   an image display supported by and extending over a first portion of a frame, the image display configured to display an image in front of a first eye of a user when the monocular image display device is worn by the user;
   a primary light amount electrochromic adjuster supported by the frame and extending over a second portion of the frame, an entirety of the primary light amount electrochromic adjuster being disposed at a non-zero distance away from and not covering a particular position of the frame corresponding to an optical axis of a second eye of the user in a direction toward the first portion so that a transmission portion exists between the particular position and a closest edge of the primary light amount electrochromic adjuster in the direction towards the first portion; and
   a secondary light amount electrochromic adjuster supported by the frame and extending over third and fourth portions of the frame that sandwich the image display vertically, wherein
   the primary light amount electrochromic adjuster controls a first amount of light that reaches the second eye, and
   the secondary light amount electrochromic adjuster controls a second amount of light that reaches the first eye.

2. The monocular image display device according to claim 1, wherein the image displayed by the image display is projected on a virtual projection plane to define an image region having a vertical length and a horizontal length.

3. The monocular image display device according to claim 2, wherein
   the primary light amount electrochromic adjuster is projected on the virtual projection plane as a projected primary light amount adjuster that has a vertical length and a horizontal length, and
   the vertical length of the projected primary light amount adjuster is greater than the vertical length of the image region.

4. The monocular image display device according to claim 3, wherein the horizontal length of the projected primary light amount adjuster is substantially identical to the horizontal length of the image region.

5. The monocular image display device according to claim 3, wherein the horizontal length of the projected primary light amount adjuster is greater than at least the horizontal length of the image region.

6. The monocular image display device according to claim 5, wherein the projected primary light amount adjuster is vertically elongated.

7. The monocular image display device according to claim 3, wherein
   the image region overlaps the projected primary light amount adjuster, and
   the primary light amount electrochromic adjuster adjusts an amount of external light from the projected primary light amount electrochromic adjuster.

8. The monocular image display device according to claim 1, further comprising the frame, which is eyeglass-shaped, the frame supporting the image display and the primary light amount electrochromic adjuster.

9. The monocular image display device according to claim 1, wherein the primary light amount electrochromic adjuster includes:
   a plurality of screens to screen out external light;
   an upper electrode shared by the plurality of screens; and
   a plurality of lower electrodes coupled to the plurality of screens separately to actuate the plurality of screens selectively.

10. The monocular image display device according to claim 9, wherein each of the plurality of screens includes an electrochromic element.

11. The monocular image display device according to claim 9, wherein each of the plurality of screens includes a strip.

12. The monocular image display device according to claim 1, wherein
   a first angle is formed by a line connecting a center of the second eye and an upper edge of the primary light amount electrochromic adjuster and a line connecting the center of the second eye and a lower edge of the primary light amount electrochromic adjuster, when the monocular image display device is worn by the user, and
   the first angle is greater than a second angle formed by adding a vertical rotation angle of eye movement to an effective angle of view of the user.

13. The monocular image display device according to claim 12, wherein the effective angle of view is 20 degrees.

14. The monocular image display device of claim 1, wherein a length of the transmission portion in the direction towards the first portion is determined by an effective angle of view of the user in a vertical direction.

15. The monocular image display device of claim 14, wherein the length of the transmission portion is about 20 mm.

* * * * *